United States Patent [19]

Diassi

[11] 3,708,501
[45] Jan. 2, 1973

[54] 2,11,12,20-TETROLA-A-NORPREGNANES AND DERIVATIVES THEREOF

[75] Inventor: Patrick A. Diassi, Westfield, N.J.

[73] Assignee: E. R. Squibb & Sons, Inc., New York, N.Y.

[22] Filed: June 29, 1970

[21] Appl. No.: 50,926

Related U.S. Application Data

[60] Continuation-in-part of Ser. No. 706,793, Feb. 20, 1968, abandoned, which is a division of Ser. No. 520,631, Jan. 14, 1966, Pat. No. 3,492,359.

[52] U.S. Cl. ............................260/340.5, 424/278
[51] Int. Cl. .............................................C07d 13/00
[58] Field of Search.................................260/340.5

[56] References Cited

UNITED STATES PATENTS 3,213,142  10/1965  Weisenborn................260/340.5
3,382,253  5/1968  Holden et al.................260/340.5

Primary Examiner—Alex Mazel
Assistant Examiner—James H. Turnipseed
Attorney—Lawrence S. Levinson, Merle J. Smith, Donald J. Perrella and Burton Rodney

[57] ABSTRACT

This invention discloses A-norpregesterone acetonide having the formula:

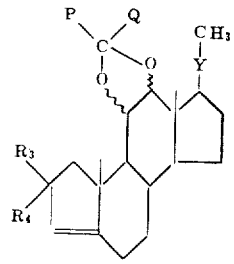

wherein $R^3$ is hydroxy; $R^4$ is hydrogen; $R^3$ and $R^4$ together is oxo (O=); Y represents C=O or

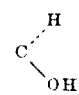

is hydrogen, lower alkyl, halo lower alkyl, carboxy lower alkyl, monocyclic cycloalkyl, monocyclic aryl, monocyclic aryl lower alkyl, monocyclic heterocyclic or monocyclic heterocyclic lower alkyl; Q is lower alkyl, halo lower alkyl, carboxy lower alkyl, monocyclic cycloalkyl, monocyclic aryl, monocyclic aryl lower alkyl, monocyclic heterocyclic or monocyclic heterocyclic lower alkyl or together with the carbon atoms to which they are joined P and Q are cycloalkyl or monocyclic heterocyclic. The compounds of this invention have been found to be useful as progestational agents.

5 Claims, No Drawings

2,11,12,20-TETROL-A-NORPREGNANES AND DERIVATIVES THEREOF

This application is a continuation-in-part application of U. S. Pat. application, Ser. No. 706,793, filed Feb. 20, 1968, now abandoned which is a divisional application of U. S. Pat. application, Ser. No. 520,631, filed Jan. 14, 1966 now patent No. 3,492,359.

This invention relates to and has as its objects the provision of novel physiologically active steroids, methods for preparing the same and new intermediates in said preparation, having the structural formulas:

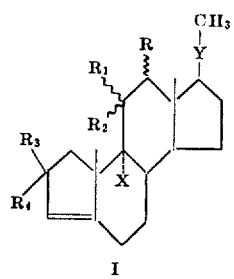
and
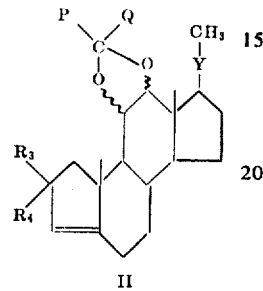

wherein the curvy lines indicate that the radical is in either the alpha or beta position; R is hydrogen, alpha hydroxy, beta hydroxy, alpha acyloxy, beta acyloxy or alpha lower alkoxy (e.g., methoxy, ethoxy, propoxy, isopropoxy, n-butoxy, N-pentoxy and n-hexoxy); $R^1$ is hydroxy; $R^2$ is hydrogen and $R^1$ and $R^2$ together is oxo (O=); $R^3$ is beta hydroxy; $R^4$ is hydrogen and $R^3$ and $R^4$ together is oxo (O=); X is hydrogen or halo (e.g., bromo or chloro); Y represents C=O or

P is hydrogen; lower alkyl, halo lower alkyl, carboxy lower alkyl ( or a salt or ester thereof), monocyclic cycloalkyl, monocyclic aryl, monocyclic aryl lower alkyl, monocyclic heterocyclic or monocyclic heterocyclic lower alkyl, and Q is lower alkyl, halo lower alkyl, carboxy lower alkyl (or a salt or ester thereof), monocyclic cycloalkyl, monocyclic aryl, monocyclic aryl lower alkyl, monocyclic heterocyclic or monocyclic heterocyclic lower alkyl, or together with the carbon atom to which they are joined P and Q are cycloalkyl or monocyclic heterocyclic. Particularly preferred are those compounds wherein P is lower alkyl and Q is lower alkyl or monocyclic aryl.

The preferred acyloxy radicals are those of hydrocarbon carboxylic acids of less than twelve carbon atoms, as exemplified by the lower alkanoic acids (e.g., acetic, propionic, butyric, and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The compounds of this invention are pharmacologically-active steroids, useful as progestational agents. Hence the new compounds of this invention can be used in lieu of known progestational steroids in the treatment of functional uterine bleeding, for example, with concentration and/or dosage based on the activity of the particular compound. They also are active antiandrogenic agents.

The novel products of this invention are prepared by the processes of this invention which entail a number of steps starting with a 9α-halo-11β-hydroxy-A-norprogesterone, such as the 9α-bromo derivative. The steps of the process may be represented by the following equations, wherein R, P and Q are as hereinabove defined:

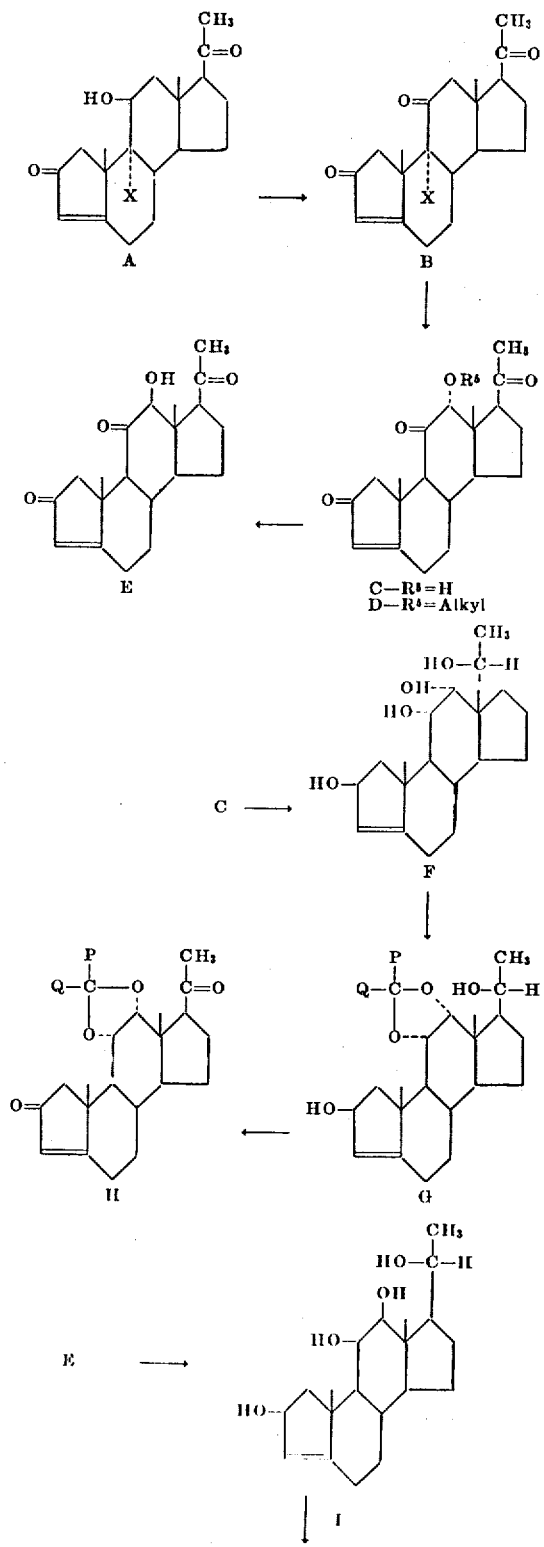

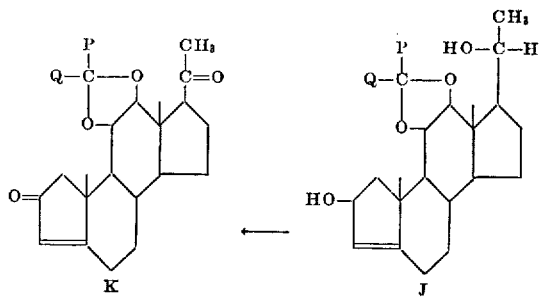

The steroids of this invention can be prepared by treating 9α-bromo-11-hydroxy-A-norprogesterone (Compound A) with a hexavalent chromium compound, such as chromic anhydride to yield the corresponding 9α-bromo-11-keto-A-norprogesterone. (Compound B). This compound is then treated with an alkali lower alkoxide in lower alkanol (e.g., sodium methoxide in methanol) whereby the corresponding 12α-(lower alkoxy)-11-keto-A-norprogesterone (Compound D) is obtained. The 12α-hydroxy-11-keto-A-norprogesterone (Compound C) intermediate of the invention may be prepared by treating Compound B with a solution of alkali metal hydroxide (e.g., sodium hydroxide) and dioxane. Compound C is then epimerized with an alkali metal hydroxide (e.g., potassium hydroxide) in alkanol to form 12β-hydroxy-11-keto-A-norprogesterone.

The 12α-hydroxy and 12β-hydroxy-intermediates of the invention may then be reduced with lithium aluminum hydride to yield the corresponding A-norpregn-3-ene-2β,11α-12α,20β-tetrol (Compound F) and A-norpregn-3-ene-2β,11β,12β-20β-tetrol (Compound I). When Compound D 12α-(lower alkoxy)-11-keto-A-norprogesterone is reduced in a like manner, the corresponding A-norpregn-3-ene-12α-alkoxy-2β,11α,20 β-triol is obtained.

Compounds F and I are then reacted with a ketone or an aldehyde of at least two carbon atoms, the reaction preferably being carried out by treating a suspension or solution of the steroid in the ketone or aldehyde (or an organic solvent if the ketone or aldehyde is a solid) with an acid catalyst (e.g., perchloric acid, p-toluene sulfonic acid, and hydrochloric acid), neutralizing the acid and recovering the 11α,12α-cyclic ketal or acetal of Compound F and the 11α,12β-cyclic ketals or acetals of Compound I formed, Compounds G and J, respectively. Compounds G and J may then be treated with a hexavalent chromium compound to yield Compounds H and K.

Among the suitable ketones and aldehydes that can be used in this step of the processes of this invention may be mentioned the lower alkanals of at least two carbon atoms, such as paraldehyde, propanal, and hexanal; di(lower alkyl)-ketones, such as acetone, diethylketone, dibutylketone, methylethylketone, and methylisobutylketone; cycloalkanones, such as cyclobutanone, cyclopentanone, cyclohexanone, suberone, and cyclohexylmethylketone and dicyclopropylketone, halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halobenzaldehydes (e.g., p-chlorobenzaldehyde and p-fluorobenzaldehyde), lower alkoxybenzaldehydes (e.g., o-anisaldehyde), di(lower alkoxy)benzaldehydes (e.g., veratraldehyde), hydroxybenzaldehydes (e.g., salicylaldehyde), dihydroxybenzaldehydes (e.g., resorcyaldehyde), lower alkyl benzaldehydes (e.g., m-tolualdehyde and p-ethylbenzaldehyde), di(lower alkyl)-benzaldehydes (e.g., o, p-dimethylbenzaldehyde), nitrobenzaldehydes, acylamidobenzaldehydes (e.g., N-acetylanthranilaldehyde), and cyanobenzaldehydes; monocyclic carbocyclic aromatic lower alkanals, such as phenylacetaldehyde, α-phenylpropionaldehyde, β-phenylpropionaldehyde, γ-phenylbutyraldehyde, and aromatically-substituted halo, lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; monocyclic heterocyclic lower alkanals; 1-(monocyclic carbocyclic aromatic) substituted lower alkanals, such as acetophenone, α,α,αtyrophenone, valerophenone, isocaprophenone, halo-phenyl lower alkyl ketons (e.g., p-chloroacetophenone and p-chloropropiophenone), (lower alkoxy)phenyl lower alkyl ketones (e.g., p-anisyl methyl ketone), di(lower alkoxy)phenyl lower alkyl ketones, hydroxyphenyl lower alkyl ketones dihydroxyphenyl lower alkyl ketones (e.g., resacetophenone), (lower alkyl)phenyl lower alkyl ketones (e.g., methyl p-tolyl ketone), di-(lower alkyl) phenyl lower alkyl ketones (o,p-xylyl methyl ketone), nitrophenyl lower alkyl ketones (e.g., p-nitroacetophenone), acyl-amidophenyl lower alkyl ketones (e.g., acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically substituted derivatives thereof; 1-(monocyclic heterocyclic)-substituted lower alkanals, such as 2-acetylfuran, 2-benzoylfuran, and 2-acetylthiophene; oxo substituted monocyclic heterocyclics, such as alloxan; monocyclic heterocyclic lower alkanones, and oxo lower alkanoic acids such as glyoxylic, pyruvic, acetoacetic, β-keto propionic, α-ketobutyric, levulinic, β-keto-caproic and β-ketocaprylic acid [as well as salts and esters thereof, such as the lower alkyl esters (e.g., methyl and ethyl)].

If a keto acid is employed as the acetalizing or ketalizing agent, although the free acid may be used as such, thereby directly yielding the free acid derivative, a preferred method for forming these derivatives is by an initial reaction with an ester of the desired ketoacid and subsequent hydrolysis of the ester derivative, as by treatment with a dilute mineral acid, to yield the free acid derivative. The free acid can then, if desired, be neutralized with any desired base (preferably ammonium hydroxide or an alkali metal hydroxide, such as sodium hydroxide and potassium hydroxide), to yield the salt derivative, or esterified by reaction with the desired alcohol (preferably a lower alkanol, such as methanol), in the usual manner, to yield an ester derivative, which differs from the initial ester reactant.

The alkoxides and ketones as set forth above are reacted in a manner similar to that disclosed in U. S. Pat. No. 3,048,581.

The following Examples illustrate the invention (all temperatures being in degrees Centigrade):

EXAMPLE 1

9α-bromo-11-keto-A-norprogesterone

To a solution of 2.0 g. of 9α-bromo-11β-hydroxy-A-norprogesterone in 100 ml. of reagent grade acetone 1.75 ml. of an aqueous solution containing 200 mg. of chromic anhydride and 320 mg. of sulfuric acid per milliliter are added dropwise with stirring. The excess oxidizing agent is decomposed by the addition of a few drops of methanol and the mixture is diluted with water and extracted with chloroform. The chloroform extract is washed with water and evaporated under reduced pressure. Crystallization of the residue from acetone gives 1.0 g. of 9α-bromo-11-keto-A-norprogesterone having a melting point about 173–175°, $[\alpha]_D^{22} + 217°$ (chloroform), $\lambda_{max}^{alc}$ 229 mμ (ε 16,800); $\tau_{CDCl_3}^{Si(Me)_4}$ 4.13 (s, 3-H), 6.61 (d, J = 14, 12-H), 7.89 (s, 21-Me), 8.48 (s, 19-Me); 9.34 (s, 18-Me).

ANAL. Calc'd for $C_{20}H_{25}O_3Br$ (393.31): C, 61.07; H, 6.41; Br, 20.31.
Found: C, 61.28; H, 6.28; Br, 21.33.

EXAMPLE 2

12α-methoxy-11-keto-A-norprogesterone

To a solution of 500 mg. of 9α-bromo-11-keto-A-norprogesterone in 15 ml. of methanol is added 0.75 ml. of 2N sodium methoxide in methanol and the solution stirred under nitrogen at room temperature for twenty-four hours. It is then neutralized with 10 percent acetic acid diluted with water and extracted with chloroform. The chloroform is washed with water, dried over sulfate and evaporated under reduced pressure. The residue on crystallization from acetone-hexane gives 280 mg. of 12α-methoxy-11-keto-A-norprogesterone having a melting point about 163–165°; $[\alpha]_D^{22} + 142°$ (chloroform), $\lambda_{max}^{alc}$ 227 mμ (ε, 14,500); $\tau_{CDCl_3}^{Si(Me)_4}$ 4.20 (s, 3-H), 6.59 (s 12β-H), 6.69 (s, O-Me); 7.92 (s, 21-Me), 8.83 (s, 19-Me), 9.39 (s, 18-Me).

ANAL. Calc'd for $C_{21}H_{28}O_4$ (344.44): C, 73.22; H, 8.19.
Found: C, 73.35; H, 8.30.

EXAMPLE 3

12α-Hydroxy-11-keto-A-norprogesterone

To a solution of 700 mg. of 9α-bromo-11-keto-A-norprogesterone in 35 ml. of dioxane and 7 ml. of water are added 14 ml. of 2 N sodium hydroxide and the mixture stirred under nitrogen at room temperature for 2.5 hours. The solution is then neutralized with 10 percent acetic acid, diluted with water and extracted with chloroform. The chloroform is washed with water and evaporated under reduced pressure. The residue on crystallization from methanol gives 380 mg. of 12α-hydroxy-11-keto-A-norprogesterone having a melting point about 253°–255°, $[\alpha]_D^{22} + 130°$ (chloroform), $\tau_{max}^{alc}$ 227 mμ (ε, 16,900), $\tau_{CDCl_3}^{SiMe_4}$ 4.21 (s, 3-H), 5.46 (d, J = 3.5, 12α-OH), 6.06 (d, J = 3.5, 12β-H), 7.86(s, 21-Me), 8.67 (s, 19-Me), 9.39 (s, 18-Me).

ANAL. Calc'd for $C_{20}H_{26}O_4$ (330.41): C, 72.70; H, 7.93
Found: C, 72.55; H, 8.04.

EXAMPLE 4

12β-Hydroxy-11-keto-A-norprogesterone

To a solution of 2.5 g. of potassium hydroxide in a mixture of 43.7 ml. of methanol and 6.3 ml. of water, 500 mg. of 12α-hydroxy-11-keto-A-norprogesterone are added and the mixture refluxed under nitrogen for 3 hours. After cooling the solution is neutralized with 10 percent acetic acid, diluted with water and extracted with chloroform. The chloroform extract is evaporated under reduced pressure and the residue plate chromatographed on alumina (Activity V) from which is obtained 12β-hydroxy-11-keto-A-norprogesterone.

EXAMPLE 5

A-Norpregn-3-ene-2β,11α,12α,20β-tetrol

To a solution of 100 mg. of 12α-hydroxy-11-keto-A-norprogesterone in 25 ml. of dry tetrahydrofuran was added 100 mg. of lithium aluminum hydride in small portions over a 5-minute period. The mixture is then refluxed for 3 hours cooled and the excess reagent decomposed by the careful addition of ethyl acetate. The mixture is then diluted with water and extracted with chloroform. The chloroform extract is evaporated to dryness under reduced pressure and the residue on crystallization gives A-norpregn-3-ene-2β,11α,12α,20π⅓-tetrol.

EXAMPLE 6

A-Norpregn-3-ene-2β,11β,12β,20β-tetrol

Following the procedure of Example 5 but substituting 12β-hydroxy-11-keto-A-norprogesterone for the 12α-hydroxy-11-keto-A-norprogesterone there is obtained A-norpregn-3-ene-2β,11β,12β,20β-tetrol.

EXAMPLE 7

A-Norpregn-3-ene-2β,11α,12α,20-tetrol 11,12-Acetonide

A solution of 100 mg. of A-norpregn-3-ene-2β,11α,12α,20π⅓-tetrol in 20 ml. of acetone containing 0.02 ml. of perchloric acid is kept at room temperature for 16 hours. It is then neutralized with dilute sodium bicarbonate, diluted with water and extracted with chloroform. The chloroform extract is evaporated under reduced pressure and the residue on crystallization gives A-norpregen-3-ene-2β,11α,12α,20β-tetrol 11,12-acetonide.

EXAMPLE 8

A-Norpregn-3-ene-2β,11β,12β,20-tetrol 11,12-Acetonide

Following the procedure for Example 7 but substituting A-norpregn-3-ene-2β,11β,12β,20β-tetrol for A-norpregn-3-ene 2β,11α,12α,20β-tetrol there is obtained A-norpregn-3-ene-2β,11β,12β,20β-tetrol 11,12-acetonide.

EXAMPLE 9

11α,12α-Dihydroxy-A-norprogesterone 11,12-Acetonide

To a solution of 100 mg. of A-norpregn-3-ene-2β,11α,12α,20π⅓-tetrol 11,12-acetonide in 10 ml. of reagent grade acetone is added dropwise 0.25 ml. of an aqueous solution containing 200 mg. of chronic anhydride and 320 mg. of sulfuric acid per milliliter. The mixture is stirred for ten minutes then after the addition of a few drops of methanol the mixture is diluted with water and extracted with chloroform. The chloroform is evaporated under reduced pressure and the residue on crystallization gives 11α,12α-dihydroxy-A-norprogesterone 11,12-acetonide.

EXAMPLE 10

11β,12β-Dihydroxy-A-norprogesterone 11,12-Acetonide

Following the procedure of Example 9 but substituting A-norpregn-3-ene-2β,11β,12β,20β-tetrol 11,12-acetonide there is obtained 11β,12β-dihydroxy-A-norprogesterone 11,12-acetonide.

EXAMPLE 11

A-Norpegn-3-ene-2β,11α,12α,20-tetrol, Acetophenide

Utilizing an equimolar amount of acetophenone in lieu of acetone in Example 7, the compound formed is A-norpregn-3-ene-2β,11α,12α,20β-tetrol, acetophenide.

EXAMPLE 12

A-Norpregn-3-ene-2β,11β,12β,20-tetrol, p-nitroacetophenide

Utilizing an equimolar amount of p-nitroacetophenone in lieu of acetone in Example 7, the compound formed is A-norpregn-3-ene-2β,11β,12β,20β-tetrol, p-nitroacetophenide.

Moreover, if other ketones and aldehydes are substituted for the acetone in the procedure of Examples 9 and 10, the corresponding acetal and ketal derivatives are obtained. Thus methylethylketone yields the corresponding 16α,17α-(2'-butylidene) derivatives; methylisobutylketone yields 16α,17α-(4'-methyl-2'-pentylidene) derivatives; cyclohexanone yields 16α,17α16α,17α3'-pentylidenes); and paraldehyde yields 16α,17α

EXAMPLE 13

11α,12α-Chloral Derivative of A-Norpregn-3-ene-2β,11α,12α,20β-tetrol

Utilizing an equimolar amount of chloral hydrate in lieu of acetone in Example 7, the compound formed is 11α,12α3-ene-2β,11α,12α,20β-tetrol.

EXAMPLE 14

A-Norpregn-3-ene-2β,11β,12β,20-tetrol 1,1,1-Trifluoro-acetonide

Utilizing an equimolar amount of 1,1,1-trifluoroacetone in lieu of acetone in Example 7, the compound formed is A-norpregn-3-ene-2β,11β,12β,20β-tetrol 1,1,1-trifluoroacetonide.

EXAMPLE 15

11α,12α-(2'-Butylidene)11α,12α-Dihydroxy-A-norprogesterone

Utilizing an equimolar amount of methylethylketone in lieu of acetone in Example 9, the compound formed is 11α,12α-(2'-butylidene)11α,12α-dihydroxy-A-norprogesterone.

EXAMPLE 16

11β,12β-(4'-Methyl-2'-Pentylidene)-11β,12β-Dihydroxy-A-norpregesterone

Utilizing an equimolar amount of methylisobutylketone in lieu of acetone in Example 10, the compound formed is 11β,12β-(4'-methyl-2'-pentylidene)-11β,12β-dihydroxy-A-norprogesterone.

EXAMPLE 17

11α,12α-Cyclohexylidene-A-Norpregn-3-ene-2β,11α,12α,20-tetrol

Utilizing an equimolar amount of cyclohexanone in lieu of acetone in Example 7, the compound formed is 11α,12α3-ene-2β,11α,12α,20β-tetrol.

EXAMPLE 18

The Benzaldehyde Derivative of A-Norpregn-3-ene-2β,11β,12β,20β-tetrol

Utilizing an equimolar amount of benzaldehyde in lieu of acetone in Example 7, the compound formed is the benzaldehyde derivative of A-norpregn-3-ene-2β,11β,12β,20β-tetrol.

EXAMPLE 19

The Benzophenone Derivative of 11α,12α-Dihydroxy-A-norprogesterone 11,12-Acetonide Utilizing an equimolar amount of benzophenone in lieu of acetone in Example 9, the compound formed is the benzophenone derivative of 11α,12α-dihydroxy-A-norprogesterone 11,12-acetonide.

EXAMPLE 20

The Ethyl Levulinate Derivative of 11β,12β-Dihydroxy-A-norprogesterone 11,12-Acetonide Utilizing an equimolar amount of ethyl levulinate in lieu of acetone in Example 10, the compound formed is the ethyl levulinate derivative of 11β,12β-dihydroxy-A-norprogesterone 11,12-acetonide.

EXAMPLE 21

Sodium Levulinate Derivative of A-norpregn-3-ene-2β,11α,12α-20β-tetrol

Utilizing an equimolar amount of sodium levulinal in lieu of acetone in Example 7, the compound formed is sodium levulinate derivative of A-norpregn-3-ene-2β,11α,12α,20β-tetrol.

What is claimed is:

1. A compound of the formula:

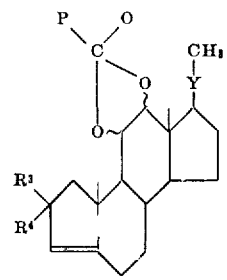

wherein the cury lines indicate that the radical is in either the alpha or beta position; $R^3$ is beta hydroxy, $R^4$ is hydrogen and $R^3$ and $R^4$ taken together is oxo; Y is selected from the group consisting of C=O and

P is selected from the group consisting of hydrogen, lower alkyl of from one to four carbon atoms, trifluoromethyl, trichloromethyl, phenyl, p-nitrophenyl, sodium salt of 2-carboxy methyl and 2-carboethoxyethyl; Q is selected from the group consisting of lower alkyl of from one to four carbon atoms, trifluoromethyl, trichloromethyl phenyl, p-nitrophenyl, sodium salt of 2-carboxyethyl and 2-carboethoxyethyl; and P and Q taken together is pentamethylene.

2. A compound in accordance with claim 1 wherein $R^3$ is $\beta$-hydroxy; $R^4$ is hydrogen; P and Q are methyl; and Y is HO—C—H and the curvy lines are in the alpha position having the name A-norpregn-3-ene-2$\beta$,11$\alpha$,12$\alpha$,20$\beta$-tetrol 11,12-acetonide.

3. A compound in accordance with claim 1 wherein $R^3$, $R^4$, P, Q and Y are as defined in claim 2 and the curvy lines are in the beta configuration having the name A-norpregn-3-ene-2$\beta$,11$\beta$,12$\beta$,20$\beta$-tetrol 11,12-acetonide.

4. A compound in accordance with claim 1 wherein $R^3$ and $R^4$ together is oxo (O=); Y is C=O; P and Q are methyl and the curvy lines are in the alpha configuration having the name 11$\alpha$,12$\alpha$-dihydroxy-A-norprogesterone 11,12-acetonide.

5. A compound in accordance with claim 1 wherein $R^3$ and $R^4$ together is oxo (O=); Y is C=O; P and Q are methyl and the curvy lines are in the beta configuration having the name 11$\beta$,12$\beta$-dihydroxy-A-norprogesterone 11,12-acetonide.

* * * * *